United States Patent [19]

Sato et al.

[11] Patent Number: 5,749,015
[45] Date of Patent: May 5, 1998

[54] LIGHT-QUANTITY CONTROL DEVICE WITH SPRING CONTROL OF LIGHT CONTROL MEMBER

[75] Inventors: Osamu Sato; Koichi Shimada, both of Saitama-ken, Japan

[73] Assignee: Canon Denshi Kabushiki Kaisha, Saitama-ken, Japan

[21] Appl. No.: 417,829

[22] Filed: Apr. 6, 1995

Related U.S. Application Data

[62] Division of Ser. No. 409,541, Mar. 24, 1995, which is a continuation of Ser. No. 238,579, May 5, 1994, abandoned, which is a continuation of Ser. No. 811,794, Dec. 20, 1991, abandoned.

[30] Foreign Application Priority Data

| Dec. 25, 1990 | [JP] | Japan | 2-419082 |
| May 27, 1991 | [JP] | Japan | 3-121323 |
| May 27, 1991 | [JP] | Japan | 3-121324 |
| May 27, 1991 | [JP] | Japan | 3-121325 |

[51] Int. Cl.$^6$ ............................................ G03B 9/06
[52] U.S. Cl. .................................... 396/508; 396/510
[58] Field of Search ........................... 354/270, 271.1, 354/274, 228–231, 234.1, 250; 396/505, 508, 510, 439, 452, 458, 459, 460, 463, 470, 493

[56] References Cited

U.S. PATENT DOCUMENTS

5,313,244  5/1994  Arai ............................. 354/271.1 X

*Primary Examiner*—Safet Metjahic
*Assistant Examiner*—J. K. Han
*Attorney, Agent, or Firm*—Robin, Blecker Daley and Driscoll

[57] ABSTRACT

A light-quantity control device having a light-quantity control member which moves to change an aperture opening amount. A drive source swings the light-quantity control member in one direction and a spring having a coil part urges the light-quantity control member against the swinging direction of the drive source. A base member having an aperture fixedly supports the drive source and swingably supports the light-quantity control member. The base member has a shaft for carrying the coil part of the spring. The shaft is formed at a position outside the supporting position of the drive source on the base member relative to the center of the aperture.

3 Claims, 12 Drawing Sheets

LIGHT-QUANTITY CONTROL DEVICE WITH SPRING CONTROL OF LIGHT CONTROL MEMBER

This application is a division of application Ser. No. 08/409,541, filed Mar. 24, 1995; which is a continuation of Ser. No. 08/238,579, filed May 5, 1994 abandoned, which is a continuation of Ser. No. 07/811,794, filed Dec. 20, 1991, abandoned.

BACKGROUND OF THE INVENTION

1. Field of the Invention

This invention relates to a light-quantity control device for use in a video camera or the like.

2. Description of the Related Art

Figure 7:
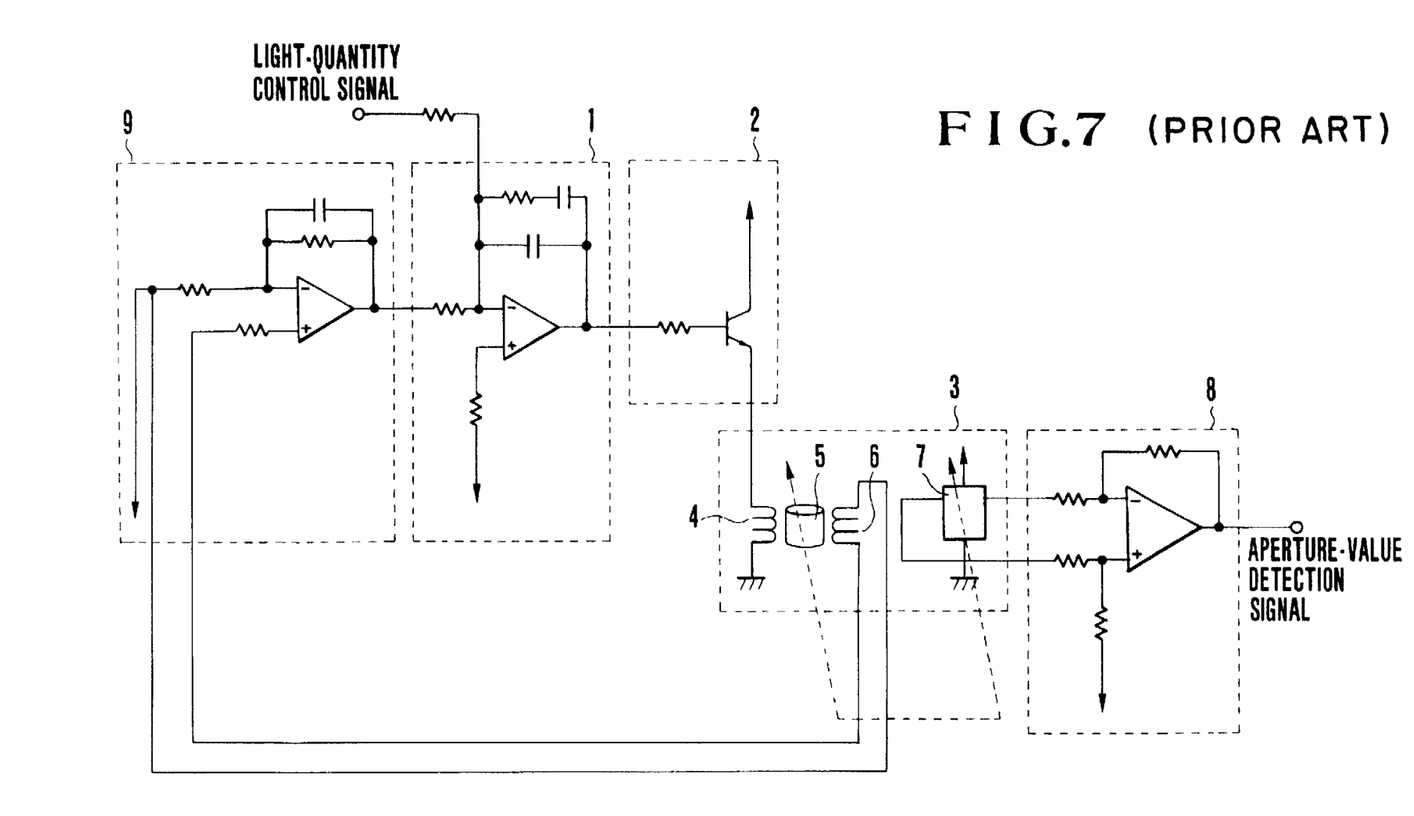
FIG. 7 is a circuit diagram showing the essential arrangement of the control circuit of a light-quantity control device of the prior art.
Figure 8:
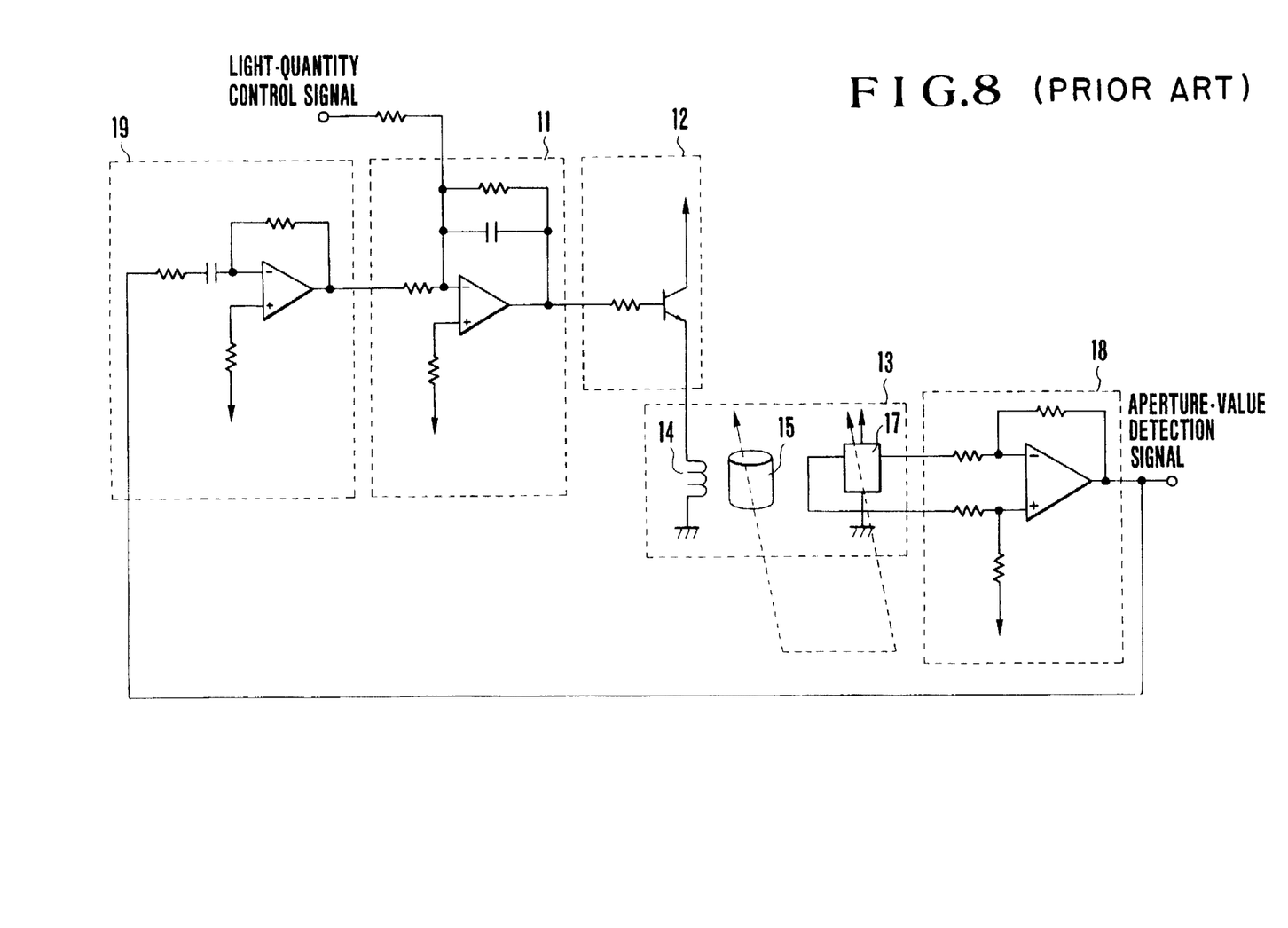
FIG. 8 is a circuit diagram showing the essential arrangement of the control circuit of another light-quantity control device previously proposed.

Heretofore, a light-quantity control device having a control system which is arranged as shown in FIGS. 7 or 8 has been proposed. FIG. 7 shows in a circuit diagram the essential arrangement of the control circuit of the conventional light-quantity control device. Referring to FIG. 7, a motor part 3 is arranged to drive a light-quantity control member. The motor part 3 includes a driving coil 4 for causing a magnet rotor 5 to rotate according to the output of a power amplifier 2 which is arranged to make into a motor driving signal a speed error signal outputted from a differential amplifier 1 which is arranged to compare a light-quantity control signal with a speed control signal; the magnet rotor 5 which is arranged to move the light-quantity control member; a damping coil 6 which is arranged to detect the rotating speed of the magnet rotor 5; and a magnetic sensitive element 7 which is arranged to detect the position of the magnet rotor 5. A signal outputted from the damping coil 6 is inputted to the differential amplifier 1 as the speed control signal via a signal amplifier 9. A linear position detection signal which is outputted from the magnetic sensitive element 7 is converted into a linear aperture-value detection signal and outputted via a differential amplifier 8.

FIG. 8 shows in a circuit diagram the essential arrangement of the control circuit of another light-quantity control device which has been proposed also in the past. In the device, a motor part 13 is arranged to drive a light-quantity control member. The motor part 13 includes a driving coil 14 for causing a magnet rotor 15 to rotate according to the output of a power amplifier 12 which is arranged to make into a motor driving signal a speed error signal outputted from a differential amplifier 11 which compares a light-quantity control signal with a speed control signal; the magnet rotor 15 which is arranged to move the light quantity control member; and a magnetic sensitive element 17 which is arranged to detect the position of the magnet rotor 15. A linear position detection signal which is outputted from the magnetic sensitive element 17 is converted into a linear aperture-value detection signal and is outputted via a differential amplifier 18. Further, the linear aperture-value detection signal is converted into a speed control signal by a differentiation circuit 19. The speed control signal is inputted to the differential amplifier 11.

In each of the conventional devices described, the speed control signal is an output proportional to the rotating speed of the magnet rotor but not proportional to a rate of change per unit time of the area of an aperture (aperture value). Although speed control thus can be performed with a constant strength in relation to the rotating speed of the magnet rotor, the speed control is not uniformly performed in relation to a rate of change per unit time of the quantity of light which is an essential target for the control. In other words, with respect to a change of the quantity of light, an action of the light-quantity control member becomes too slow at a large aperture (on the side of a maximum aperture) and too fast at a small aperture (on the side of a minimum aperture) under the above-stated conventional speed control. Under such a control, hunting tends to take place on the side of a minimum aperture in the event of an excessive quantity of light and, moreover, the response time of the light-quantity control member becomes too slow in shifting the aperture from a maximum position to a minimum position.

Further, in the case of the conventional device, the aperture-value detection signal is a linear position detection signal which is in proportion to the amount of driving of the magnet rotor but not in proportion to a rate of change of the area of an aperture. The accuracy of detecting an aperture value, therefore, excessively degrades on the side of the minimum aperture.

Figure 12:
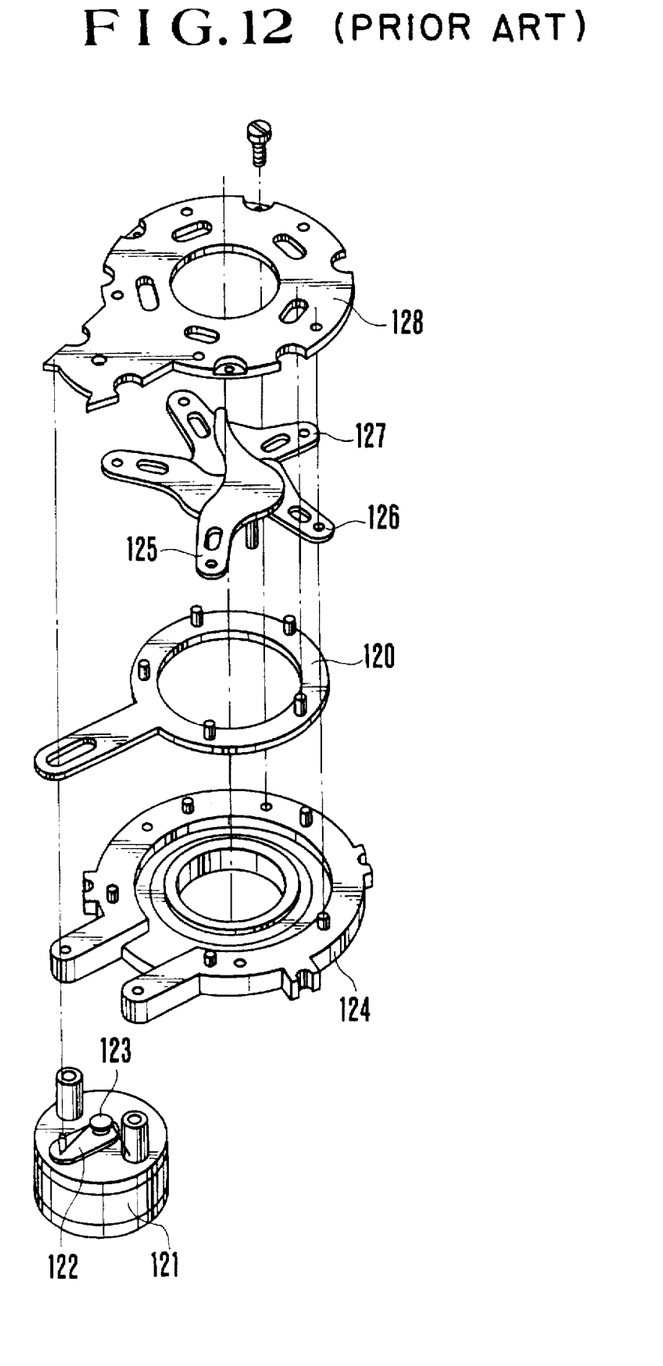
FIG. 12 is an exploded oblique view showing the light-quantity control device of the prior art.

In a case where a diaphragm device of a video camera or the like is in a circular shape having at least three blades, it has been necessary to employ a ring-shaped member 120, as shown in FIG. 12, for opening and closing the diaphragm blades in an interlocking relation. A lever 122 which is connected to the rotation shaft of a motor 121 is arranged to engage the diaphragm blades 125, 126 and 127 through the ring-shaped member 120. Further, there is provided a cover plate 128 which is arranged to prevent the diaphragm blades from coming off the diaphragm unit and also to provide a sliding face for the diaphragm blades.

In accordance with the above-stated conventional arrangement, however, the diaphragm blades 125, 126 and 127 cannot be smoothly turned (opened and closed), because a load for rotating the ring-shaped member 120 is large and because the amount of space in the direction of the plate thickness of the diaphragm blades 125 to 127 cannot be kept constant due to unevenness of the ring-shaped member 120 in the direction of the plate thickness thereof. Besides, a reduction in thickness and size of the device is limited by a space required for the ring-shaped member 120. The conventional arrangement thus has caused difficulty also in reducing the weight of the light-quantity control device.

In addition to these problems, another problem with the conventional arrangement lies in that the presence of the lever 122 in the path of driving force transmission to the diaphragm blades degrades the efficiency of the driving force transmission. A further problem lies in that the presence of the cover plate 128 increases a sliding resistance of the diaphragm blades. A still further problem lies in that these members require spaces for them and thus limits a possible reduction in thickness and size of the device. The presence of these members also makes a reduction in weight difficult.

SUMMARY OF THE INVENTION

It is one aspect of the invention to provide a light-quantity control device which is capable of performing speed control always apposite to a rate of change in the quantity of light by virtue of speed control means arranged in the device to perform the speed control in proportion to a rate of change per unit time of the area of an aperture.

It is another aspect of the invention to provide a light-quantity control device which has the rotation shaft of a driving part connected to a central rotation shaft of a diaphragm blade in such a way as to allow the rotary motion of the driving part to be directly converted into the rotary motion of the diaphragm blade, so that the diaphragm blade can be driven with a small driving force.

It is a further aspect of the invention to provide a light-quantity control device which permits a reduction in size and facilitates adjustment by virtue of the arrangement thereof, wherein a return spring which is arranged to return diaphragm blades in the direction of closing them has its one end secured to a base plate and the other end secured to a driving member; a shaft which is arranged to serve as a guide for the return spring is provided on the base plate; and a coil part of the return spring is disposed more outward than the outer peripheral part of a motor.

It is a still further aspect of the invention to provide a light-quantity control device which permits a reduction in size and weight thereof by virtue of the arrangement thereof, wherein a plurality of diaphragm blades are interconnected through projections and cam-like slots which are formed on and in the diaphragm blades and arranged to engage each other in such a manner that a driving force which is transmitted to a specific diaphragm blade is transmitted also to other diaphragm blades.

These and other aspect and features of the invention will become apparent from the following detailed description of embodiments thereof taken in connection with the accompanying drawings.

DETAILED DESCRIPTION OF THE PREFERRED EMBODIMENTS

Figure 1:
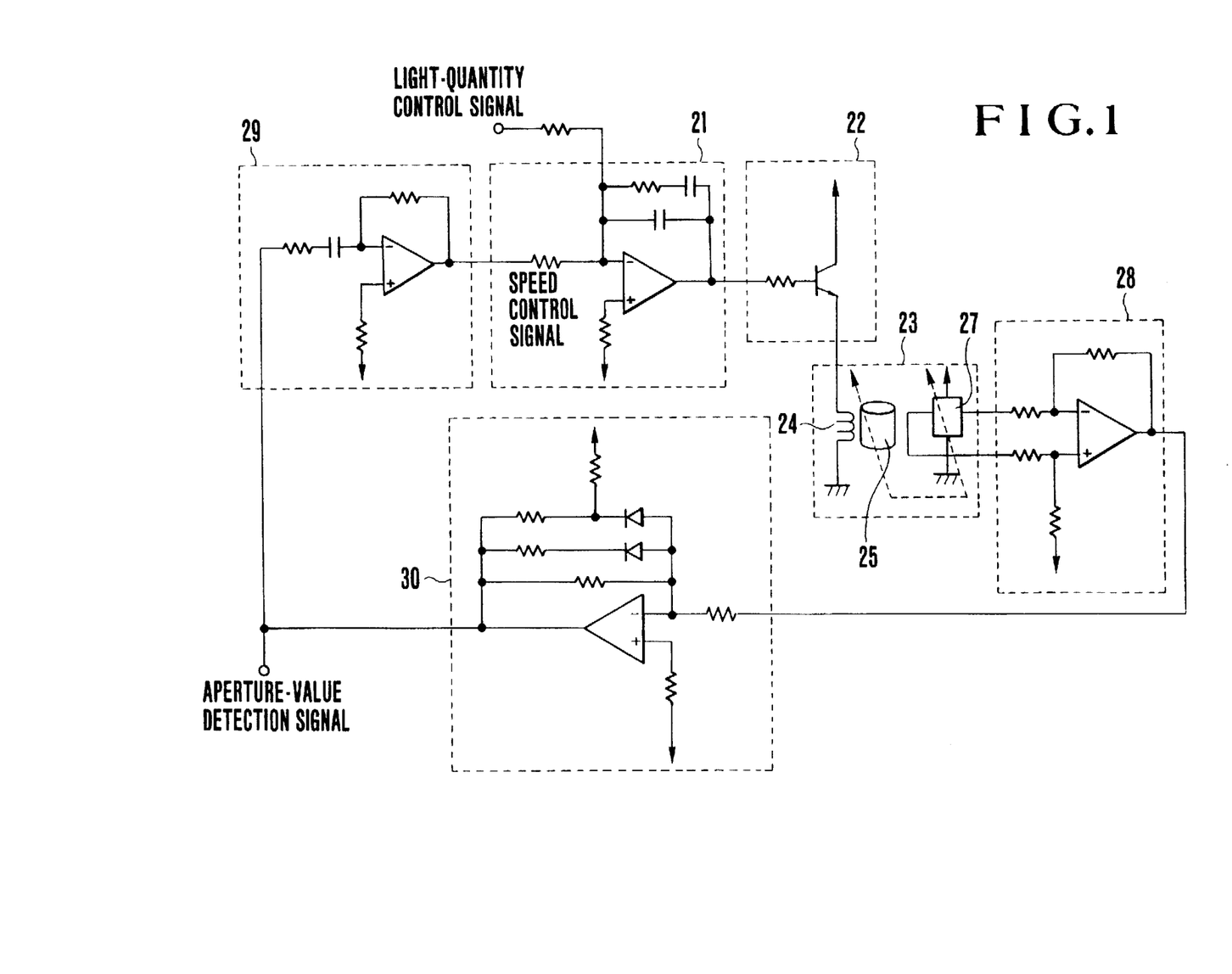
FIG. 1 is a circuit diagram showing in outline the arrangement of the control part of a light-quantity control device which is arranged as a first embodiment of this invention.

A first embodiment of this invention is described with reference to FIGS. 1 to 6 as follows:

FIG. 1 is a circuit diagram showing in outline the arrangement of the control part of a light-quantity control device which is arranged as the first embodiment of this invention.

Referring to FIG. 1, a differential amplifier 21 is arranged to compare a light-quantity control signal with a speed control signal. A power amplifier 22 is arranged to make a speed error signal outputted from the differential amplifier 21 into a signal for driving a magnet rotor 25. A motor part 23 includes a driving coil 24, the magnet rotor 25 and a magnetic sensitive element 27 and is arranged to drive light-quantity control members 34 and 35 which will be described later herein. The driving coil 24 is arranged to cause the magnet rotor 25 to rotate according to the output signal of the power amplifier 22. The magnet rotor 25 is arranged to rotate for driving the light-quantity control members 34 and 35. The magnetic sensitive element 27 is arranged to linearly detect the position of the magnet rotor 25. A differential amplifier 28 is arranged to amplify and adjust the output of the magnetic sensitive element 27 to a given linear value. A differentiation circuit 29 is arranged to convert the linear output of a function generator 30 into the speed control signal. The function generator 30 is arranged to convert the position detection signal of the differential amplifier 28 which is in a linear form into a position detection signal having a rate of change proportional to a rate of change of the area of an aperture and to output the thus-converted position detection signal as an aperture-value detection signal.

Figure 2:
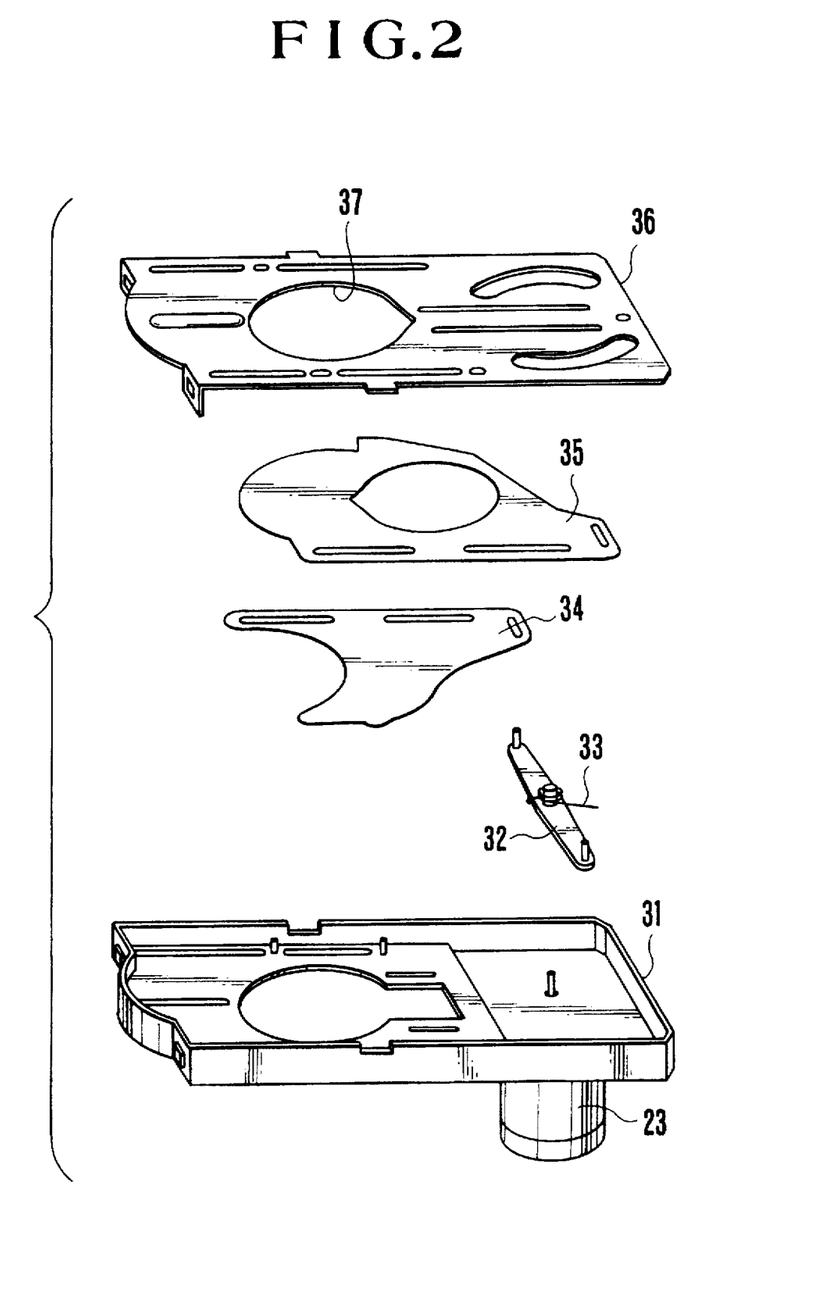
FIG. 2 is an exploded oblique view showing the light-quantity control device arranged as the first embodiment.

FIG. 2 shows in an exploded oblique view the above-stated light-quantity control device. In FIG. 2, a reference numeral 23 denotes the above-stated motor part. A diaphragm base plate 31 is arranged to carry the motor part 23 on one side thereof and to carry, on the other side, diaphragm blades 34 and 35 which are employed as the above-stated light-quantity control members. The base plate 31 has an aperture part. A driving arm 32 is arranged to transmit the driving force of the motor part 23 to the diaphragm blades 34 and 35. A spring 33 is arranged to constantly urge the diaphragm blades 34 and 35 to move in the direction of closing the diaphragm. The diaphragm blades 34 and 35 which are employed as the light-quantity control members control the quantity of light by making a sliding movement in such a way as to vary an amount of opening of the aperture. A cover 36 is arranged to house the diaphragm blades 34 and 35 and has an aperture part 37.

With the embodiment arranged as described above, the light-quantity control signal is first applied to the driving coil 24 via the differential amplifier 21 and the power amplifier 22. As a result, the driving coil 24 is energized to rotate the magnet rotor 25. The diaphragm blades 34 and 35 are driven by the rotation of the magnet rotor 25. The rotating position of the magnet rotor 25 is linearly detected by the magnetic sensitive element 27. The output signal of the magnetic sensitive element 27 is inputted via the differential amplifier 28 to the function generator 30 as a position detection signal in a given linear form. The function generator 30 converts the linear position detection signal into a linear position detection signal which is proportional to a rate of change of the area of the aperture as shown by a line $V_O$ in FIG. 3 or FIG. 4. The function generator 30 then outputs the thus-converted linear position detection signal as an aperture-value detection signal.

The aperture-value detection signal which is linear relative to a rate of change of the area of the aperture is inputted to the differentiation circuit 29. The differentiation circuit 29 then outputs a speed control signal which is proportional to the inclination of the linear aperture-value detection signal. More specifically, the speed control signal is proportional to a rate of change per unit time of the area of the aperture, as shown by a line $V_3$ in FIGS. 5 and 6. This speed control signal is inputted to the differential amplifier 21 to be compared with the light-quantity control signal. As a result, the differential amplifier 21 outputs a speed error signal which serves to prevent the light-quantity control signal from abruptly changing. The speed error signal passes through the power amplifier 22 to energize with current the driving coil 24. The driving coil 24 then causes the magnet rotor 25 to rotate. The rotation of the magnet rotor 25 drives the diaphragm blades 34 and 35 to speedily set the quantity of light at an apposite value. It is a feature of the embodiment that the function generator 30 and the differential amplifier 29 cause the speed control signal to be proportional to a rate of change per unit time of the area of the aperture and not proportional to the rotating speed of the magnet rotor 25. In other words, the speed control signal is an output which is proportional to a rate of change per unit time of the quantity of light which is the essential target for the control, so that speed control can be always appositely performed.

Figure 3:
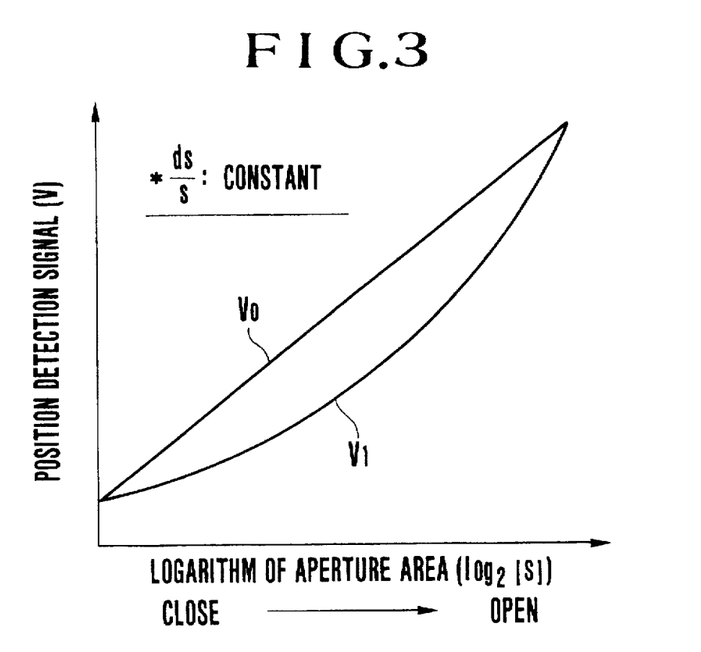
FIG. 3 is a graph showing a position detection signal obtained with a rate of change of the area of an aperture assumed to be constant.

FIG. 3 shows the position detection signal (the aperture-value detection signal) obtained when the diaphragm blades are moved from a closed position to a fully open position with a rate of change of the area of the aperture "ds/s" assumed to be constant. In FIG. 3, a line $V_0$ represents the aperture-value detection signal according to this embodiment of the invention. Another line $V_1$ represents an aperture-value detection signal obtained by the conventional device. The logarithm of the area of the aperture with "2" taken as a base thereof, which is shown on the axis of abscissa, makes a rate of change of the area of the aperture "ds/s" constant relative to equally spaced graduations. It is apparent from the illustration that the conventional position detection signal $V_1$ is improved to become the position detection signal $V_0$ of this embodiment having a rate of change proportional to a rate of change of the area of the aperture (having a constant inclination).

Figure 4:
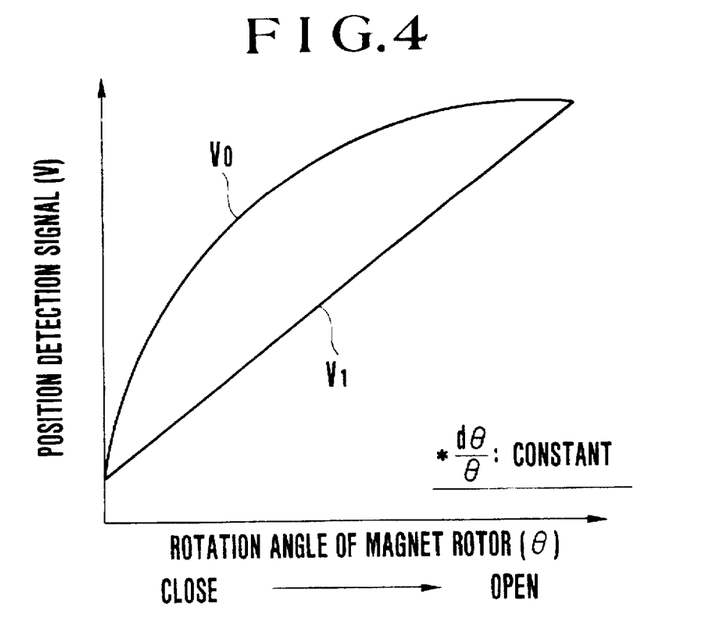
FIG. 4 is a graph showing a position detection signal obtained with a rate of change of the angle of rotation of a magnet rotor assumed to be constant.

FIG. 4 shows the position detection signal (the aperture-value detection signal) obtained with a rate of change of the angle of rotation of the magnet rotor "dΘ/Θ" assumed to be constant, in contrast to the case where a rate of change of the area of the aperture "ds/s" is assumed to be constant as shown in FIG. 3. As apparent from FIG. 4, the conventional aperture-value detection signal $V_1$ has a rate of change proportional to the rate of change of the angle of rotation "dΘ/Θ" (having a constant inclination).

Figure 5:
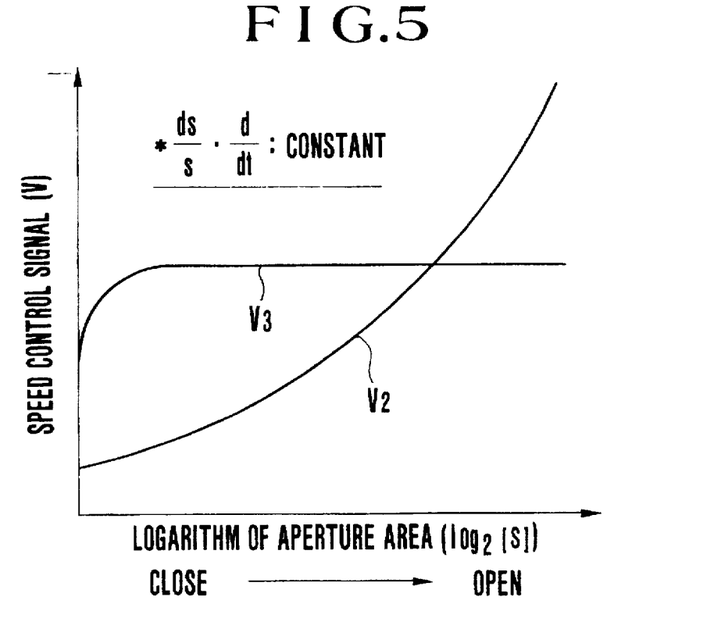
FIG. 5 is a graph showing a speed control signal obtained with a rate of change per unit time of the area of an aperture assumed to be constant.

FIG. 5 shows the speed control signal obtained with a rate of change per unit time of the area of the aperture "ds/s.d/dt" assumed to be constant. In FIG. 5, a line $V_3$ represents the speed control signal according to this embodiment of the invention. Another line $V_2$ represents the conventional speed control signal. As apparent from FIG. 5, the conventional speed control signal $V_2$ is improved to become the speed control signal $V_3$ of this embodiment having a constant output where the rate of change per unit time of the area of the aperture "ds/s.d/dt" is assumed to be constant.

Figure 6:
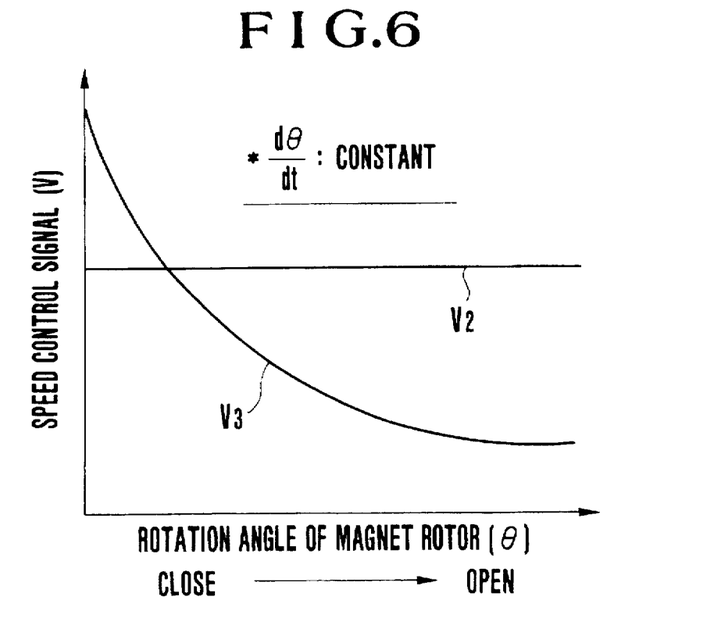
FIG. 6 is a graph showing a speed control signal obtained with the rotating speed of a magnet rotor assumed to be constant.

FIG. 6 shows the speed control signal obtained with the speed of rotation of the magnet rotor "dΘ/dt" assumed to be constant, in contrast to the case where the rate of change ds/s.d/dt is assumed to be constant as shown in FIG. 5. As apparent from FIG. 6, the conventional speed control signal $V_2$ has a constant output where the speed of rotation of the magnet rotor "dΘ/dt" is constant.

As described above, the first embodiment of this invention is arranged to perform speed control proportional to a rate of change per unit time of the area of the aperture. This arrangement enables the light-quantity control device to always adequately perform the speed control in relation to a change of the quantity of light. Therefore, the hunting which would occur at a stopped-down aperture (on the side of the minimum aperture) in the event of an excessive quantity of light can be minimized, and the response speed from the maximum aperture to the minimum aperture can be increased. The light-quantity control thus can be stably and speedily carried out with a high degree of accuracy.

Further, the accuracy of detecting an aperture value attainable on the side of the minimum aperture can be enhanced by means of the position detection signal which has a rate of change proportional to a rate of change of the area of the aperture. This arrangement contributes to the accuracy of automatic focusing performed by using aperture value information and also to the accuracy of aperture correction to be made by a so-called intelligent automatic iris device. In the case of a manual stop, the stability of control on the side of the minimum aperture in conjunction with the highly accurate aperture-value detection signal for a stopped-down aperture enables the manual stop to be accurately positioned on its minimum aperture side.

Figure 9:
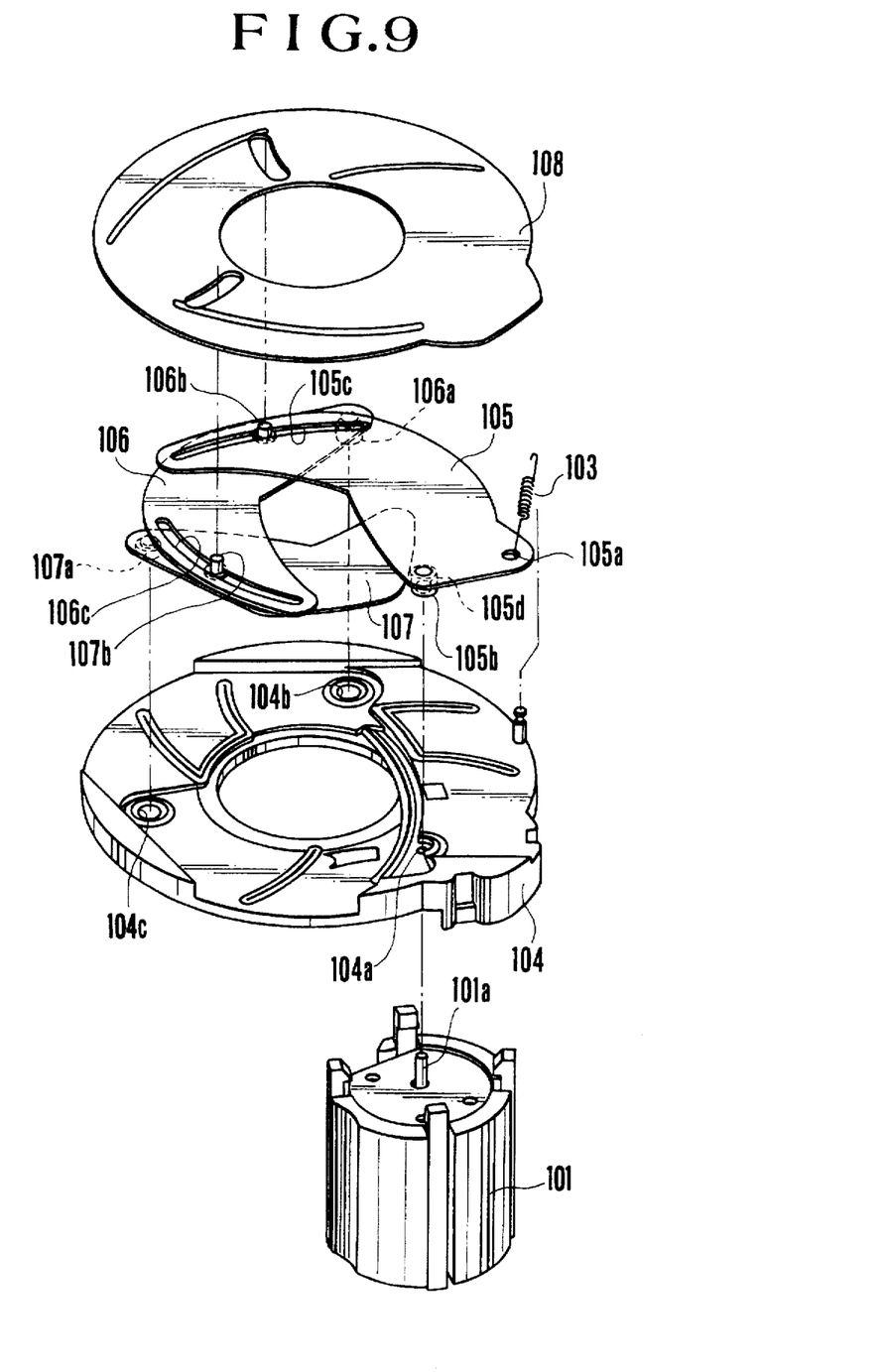
FIG. 9 is an exploded oblique view showing a light-quantity control device arranged as a second embodiment of this invention.

Next, a light-quantity control device which is arranged according to this invention as a second embodiment thereof is described below with reference to FIG. 9:

Referring to FIG. 9, a motor 101 serves as a drive source. A spring 103 is provided for returning diaphragm blades in the direction of closing them. A base plate 104 is provided for a diaphragm device. Diaphragm blades 105, 106 and 107 serve as light-quantity control members. A cover plate 108 is arranged to keep the diaphragm blades 105, 106 and 107 between it and the base plate 104.

The rotation shaft 101a of the motor 101 is connected, by press fitting or the like, to a hole 105d which is provided in the dowel 105b of the diaphragm blade 105. The diaphragm blade 105 is arranged to be turnable (or swingable) on a hole 104a provided in the base plate 104. Other diaphragm blades 106 and 107 are respectively arranged to be turnable around dowels 106a and 107a which engage holes 104b and 104c provided in the base plate 104. When the shaft 101a of the motor 101 makes a reciprocating turning motion, the diaphragm blade 105 which is connected to the shaft 101a of the motor 101 turns (opens or closes). At the same time, the diaphragm blade 106 is caused to turn (open or close) by the dowel 106b which engages a cam-like slot 105c formed in the diaphragm blade 105. Further, at the same time, the diaphragm blade 107 is caused to turn (open or close) by the dowel 107b which engages a cam-like slot 106c formed in the diaphragm blade 106. Incidentally, each of the dowels 106b and 107b is provided with a stepped part which is arranged to secure a space required for preventing interference between the diaphragm blades 105 and 106 or between the diaphragm blades 106 and 107.

The second embodiment described is arranged to obviate the necessity of use of any parts other than the diaphragm blades in opening and closing the diaphragm blades in an interlocking state. The driving force of the motor 101 can be transmitted with a minimal amount of loss to the diaphragm blades. The driving force thus can be efficiently transmitted. Further, interference between the diaphragm blades can be minimized to lessen a working load on the diaphragm blades for a smooth operation. The efficiency of driving force transmission can be enhanced by the absence of the driving lever 122 which is included in the conventional device shown in FIG. 12.

Figure 10:
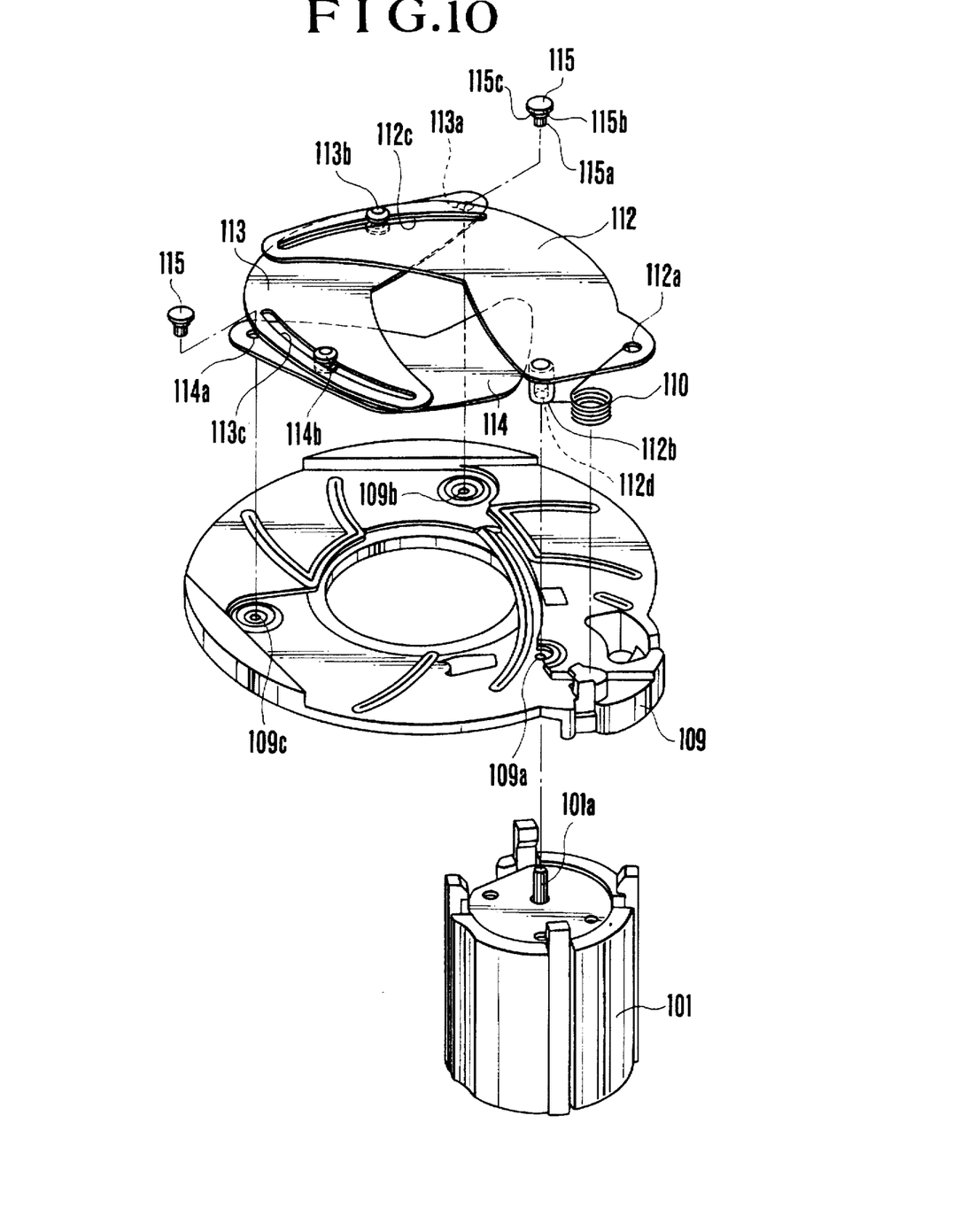
FIG. 10 is an exploded oblique view showing a light-quantity control device arranged as a third embodiment of the invention.

FIG. 10 shows a third embodiment of this invention. Referring to FIG. 10, a motor 101 serves as a drive source.

A spring 110 is arranged to return diaphragm blades in the direction of closing them. A base plate 109 is provided for a diaphragm device. Diaphragm blades 112, 113 and 114 are arranged to serve as light-quantity control members. Blade turning shafts 115 are provided for turning or swinging the diaphragm blades. The rotation shaft 101a of the motor 101 is connected, by press fitting or the like, to a hole 112d provided in the dowel 112b of the diaphragm blade 112. The diaphragm blade 112 is thus arranged to be turnable on a hole 109a provided in the base plate 109. The diaphragm blades 113 and 114 are respectively arranged to turn or swing around the parts 115b of the blade turning shafts 115 which engage holes 113a and 114a provided in the diaphragm blades 113 and 114. Parts 115a of the shafts 115 are connected, by press fitting or the like, to holes 109b and 109c provided in the base plate 109, respectively. The diaphragm blades 113 and 114 are rotatably held respectively at spaces provided between the base plate 109 and stepped parts 115c of the shafts 115.

Figure 11A:
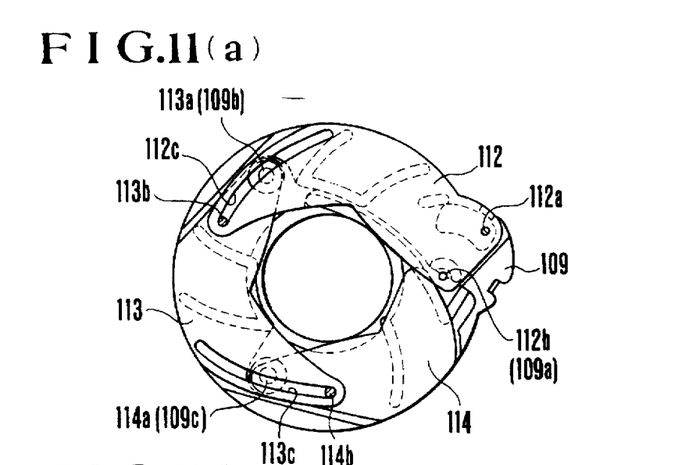
FIGS. 11(a), 11(b) and 11(c) show the action of the diaphragm blades of the light-quantity control device shown in FIG. 10.
Figure 11B:
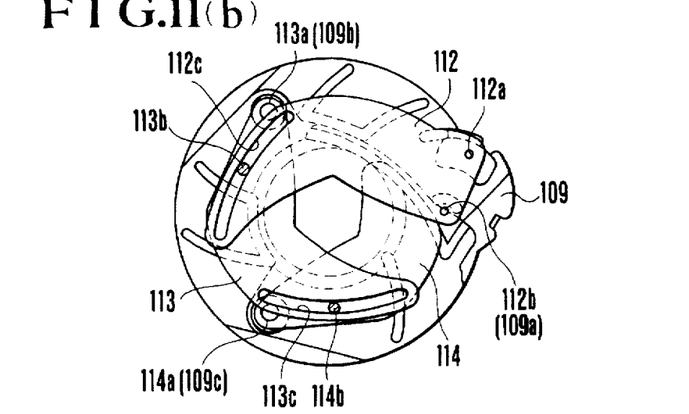
Figure 11C:
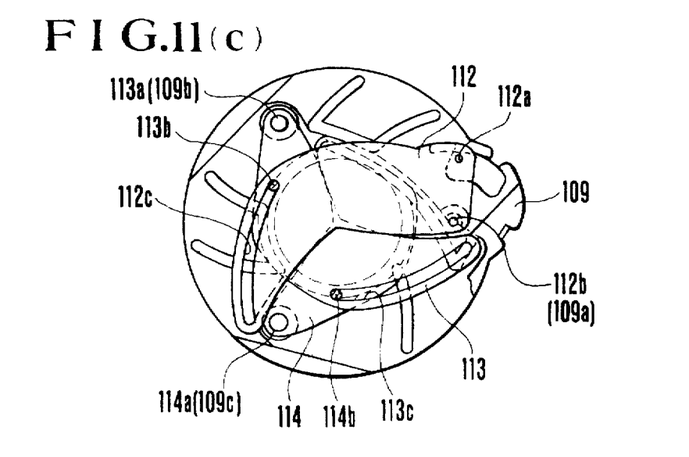

When the motor 101 makes a reciprocating turning motion, the diaphragm blade 112 which is connected to the shaft 101a of the motor 101 turns (opens or closes). At the same time, the diaphragm blade 113 is caused to turn (open or close) by a dowel 113b which engages a cam-like slot 112c formed in the diaphragm blade 112. The diaphragm blade 114 is caused, also at the same time, to turn (open or close) by a dowel 114b which engages a cam-like slot 113c formed in the diaphragm blade 113. FIGS. 11(a), 11(b) and 11(c) show the actions of the diaphragm blades 112, 113 and 114. Incidentally, each of the dowels 113b and 114b is provided with a stepped part which is arranged to prevent interference between the diaphragm blades 112 and 113 or between the diaphragm blades 113 and 114.

The second and third embodiments described above give the following advantages:

(1) No parts other than the diaphragm blades are necessary for opening and closing the diaphragm blades in an interlocking state. The loss of the driving force of the motor in transmitting to the driving force to the diaphragm blades can be lessened, so that the driving force transmission can be efficiently carried out.

(2) Interference between diaphragm blades can be minimized. Therefore, the working load on the diaphragm blades can be lessened for a smooth operation.

(3) The absence of the member 120, the driving lever 122 and the cover plate 128 shown in FIG. 12 enhances the efficiency of driving force transmission.

Figure 13:
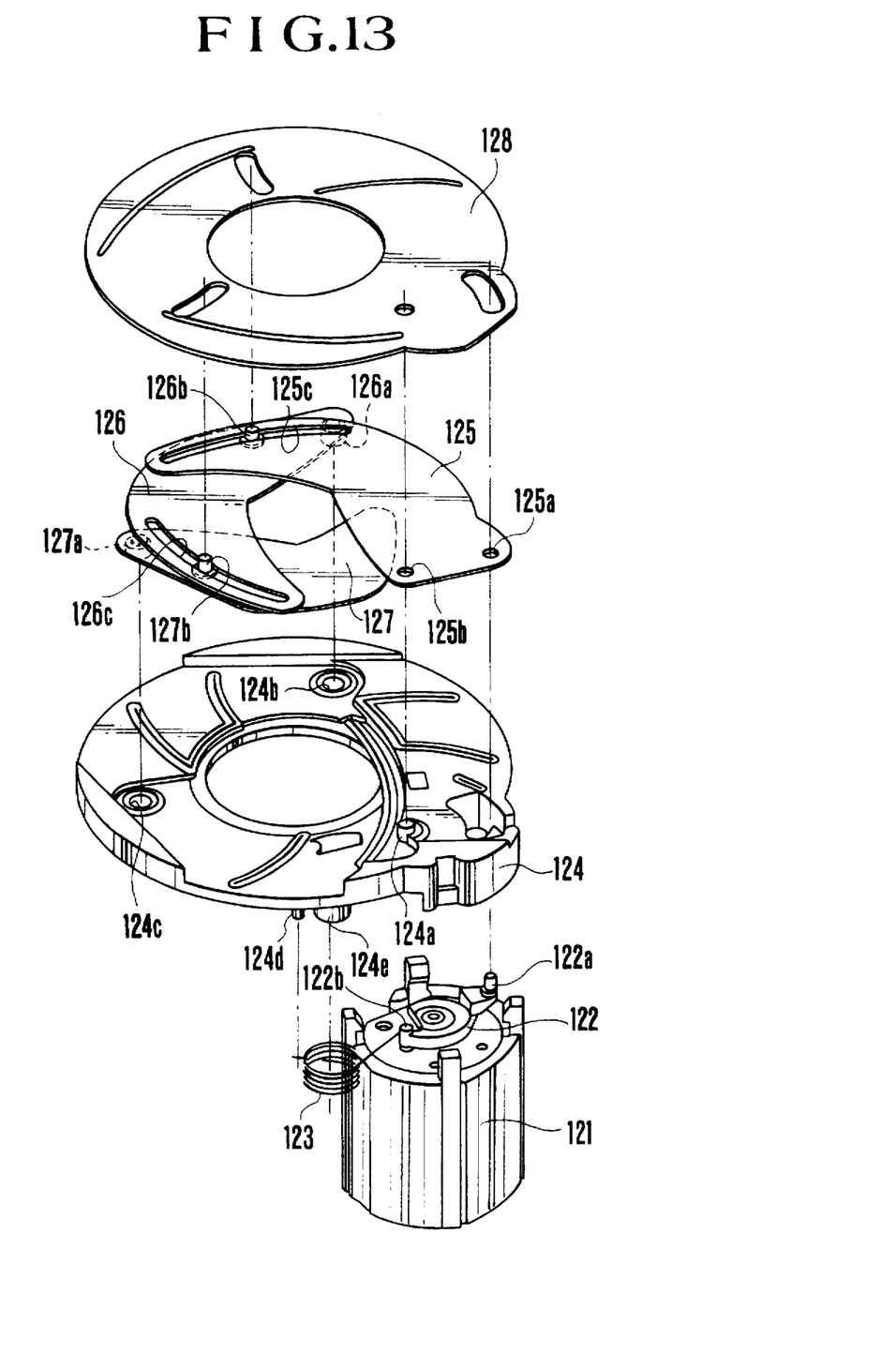
FIG. 13 is an exploded oblique view showing a light-quantity control device which is arranged as a fourth embodiment of the invention.

A fourth embodiment of the invention is described below with reference to FIGS. 13, 14(a), 14(b) and 14(c):

FIG. 13 is an exploded oblique view showing a light-quantity control device which is arranged according to this invention as the fourth embodiment thereof. Referring to FIG. 13, a motor 121 serves as a drive source. A lever 122 is provided for transmitting the driving force of the motor 121 to diaphragm blades. A spring 123 is provided for returning the diaphragm blades in the direction of closing them. A base plate 124 is provided for a diaphragm device. Diaphragm blades 125, 126 and 127 serve as light-quantity control members. A cover plate 128 is arranged to keep the diaphragm blades 125, 126 and 127 between it and the base plate 124.

Figure 14A:
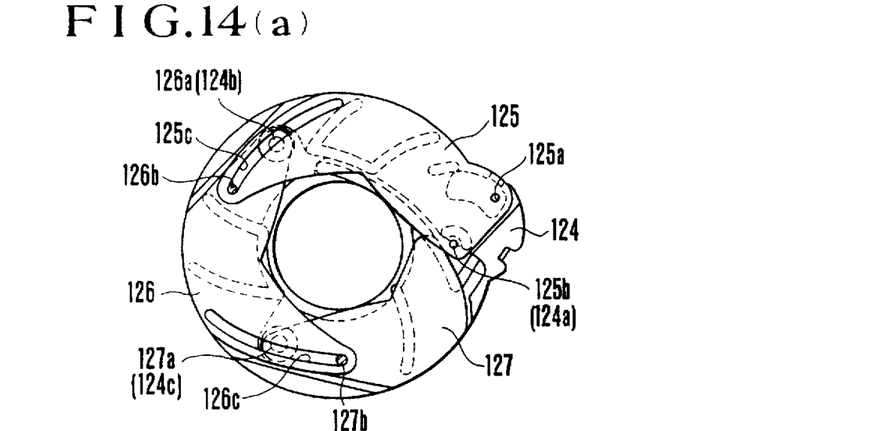
FIGS. 14(a), 14(b) and 14(c) show the action of the diaphragm blades of the light-quantity control device shown in FIG. 13.
Figure 14B:
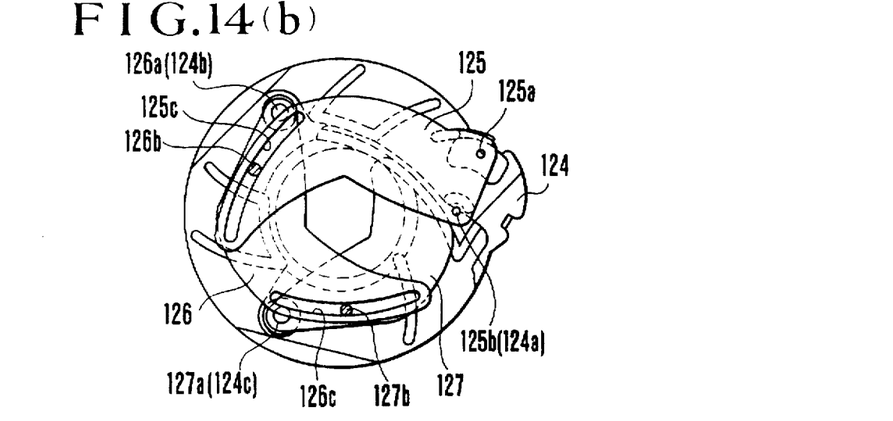
Figure 14C:
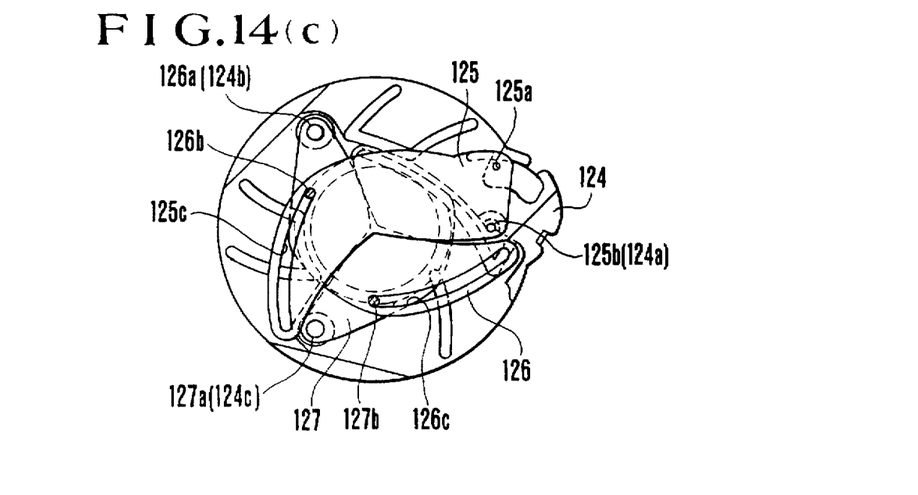

The diaphragm blade 125 is arranged to turn or swing on a hole 125b which engages a pin 124a provided on the base plate 124. Other diaphragm blades 126 and 127 are arranged to turn or swing on dowels 126a and 127a which engage holes 124b and 124c provided in the base plate 124, respectively. When the shaft of the motor 121 makes a reciprocating turning motion, the lever 122 turns. The diaphragm blade 125 is then caused to turn (open or close) jointly by a pin 122a provided on the lever 122 and a hole 125a formed in the diaphragm blade 125. At the same time, the diaphragm blade 126 is caused to turn (open or close) by a dowel 126b which engages a cam-like slot 125c formed in the diaphragm blade 125. Further, at the same time, the diaphragm blade 127 is caused to turn (open or close) by a dowel 127b which engages a cam-like slot 126c formed in the diaphragm blade 126. FIGS. 14(a), 14(b) and 14(c) show the actions of the diaphragm blades 125, 126 and 127. Incidentally, each of the dowels 126b and 127b is provided with a stepped part which is arranged to secure a space for preventing interference between the diaphragm blades 125 and 126 or between the diaphragm blades 126 and 127.

The arrangement of the embodiment shown in FIG. 13 requires no parts other than the diaphragm blades in opening and closing the diaphragm blades in an interlocking state. Therefore, the loss of the driving force of the motor 121 in transmitting the driving force to the diaphragm blades can be lessened for efficient driving force transmission. Further, the interference between the diaphragm blades can be lessened to reduce a working load on the diaphragm blades for a smooth operation.

Further, the return spring 123 is carried by a guide shaft 124e provided on the base plate 124 with one end of the return spring 123 connected to a spring engaging part 122b of the lever 122 and the other end to a spring engaging part 124d of the base plate 124.

The fourth embodiment of the invention is, as apparent from the above description, arranged to have the return spring 123 mountable and dismountable in a unitized state. The return spring 123 is, therefore, replaceable without dismounting the motor 121, so that the working load can be easily adjusted. Further, the coil part of the return spring 123 is disposed more outward than the outer diameter of a cylindrical part of the motor 121. Therefore, the position of the motor 121 in the axial direction of its cylindrical shape is shiftable toward the base plate 124 to an extent corresponding to the space of the coil part of the return spring 123. This arrangement permits a reduction in size of the device by minimizing the protruding amount of the motor 121.

What is claimed is:

1. A light-quantity control device, comprising:

a) a light-quantity control member which moves to change an aperture opening amount;

b) a drive source which swing said light-quantity control member in one direction;

c) a spring having a coil part, said spring being arranged to return said light-quantity control member to an original position when said light-quantity control member is not swung by said drive source; and d) a base member having an aperture, which fixedly supports said drive source and swingably support said light-quantity control member and has a shaft for carrying said coil part, wherein said shaft is formed at a position outside the supporting position of said drive source on said base member relative to the center of said aperture.

2. A device according to claim 1 wherein a motor is employed as said drive source, wherein a lever is turned by a rotatory output of said motor, and wherein said light-quantity control member is swung by said lever.

3. A device according to claim 1, wherein said base plate is approximately in a circular shape, wherein said light-quantity control member includes a plurality of diaphragm blades which are swingably carried by said base plate, and wherein at least one of said plurality of diaphragm blades is arranged to be swung by said drive source and other diaphragm blades are arranged to swing in an interlocking state with said at least one of diaphragm blades swung by said drive source.

* * * * *